United States Patent
Leavitt et al.

[15] 3,638,502
[45] Feb. 1, 1972

[54] STABILIZED CAMERA MOUNT

[72] Inventors: John N. Leavitt, West Flamboro, Ontario; Raigo Alas, Hamilton, Ontario; Edwin C. Dafoe, Dundas, Ontario, all of Canada

[73] Assignee: Canadian Westinghouse Company Limited, Hamilton, Ontario, Canada

[22] Filed: Dec. 1, 1969

[21] Appl. No.: 881,244

[52] U.S. Cl. ................................ 74/5.34, 74/5.42, 95/12.5
[51] Int. Cl. .......................................... G01c 19/30
[58] Field of Search ................ 74/5.22, 5.42, 5.44, 5.45, 74/5.34; 95/12.5

[56] References Cited

UNITED STATES PATENTS

| | | | |
|---|---|---|---|
| 2,506,095 | 5/1950 | Mantz | 95/12.5 |
| 2,883,863 | 4/1959 | Karsten et al. | 74/5.22 |
| 2,955,474 | 10/1960 | Sutherland | 74/5.34 |
| 3,014,376 | 12/1961 | Kenyon | 74/5.22 X |
| 3,380,310 | 4/1968 | Tommaso et al. | 74/5.22 |
| 3,492,735 | 2/1970 | Burdick et al. | 74/5.34 X |
| 3,523,660 | 8/1970 | Atteberry et al. | 74/5.22 X |

Primary Examiner—Manuel A. Antonakas
Attorney—R. H. Fox

[57] ABSTRACT

Vehicle-mounted cameras require stabilization to compensate for the erratic movement of the vehicle. This invention provides a stabilized platform for mounting on a vehicle and supporting a camera. The platform is made slightly pendulous so that it is self-erecting to the local vertical and is stabilized first by means of plurality of gyroscopes which provide an artificially amplified mass; and secondly by the movement of suitable real masses, the whole assembly being arranged within a protective fairing and controllable from a remote operators position.

7 Claims, 9 Drawing Figures

PATENTED FEB 1 1972
3,638,502
SHEET 4 OF 6
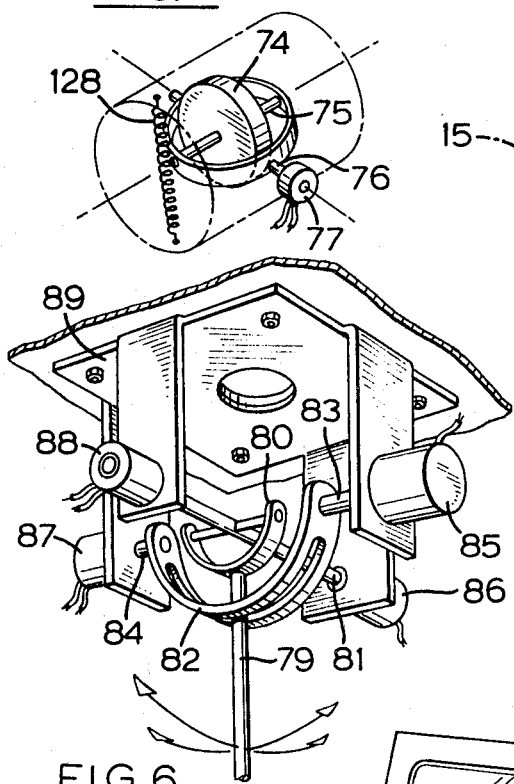
FIG. 5
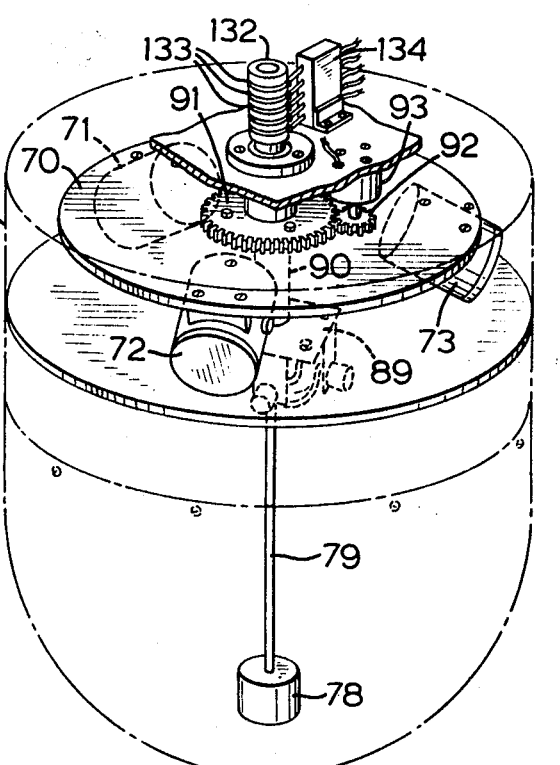
FIG. 4
FIG. 6
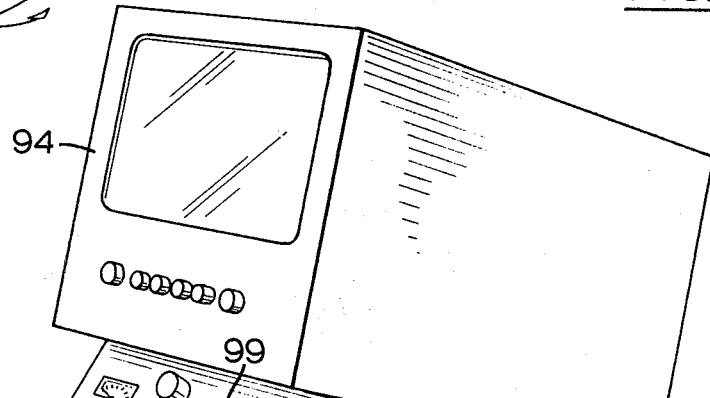
FIG. 7
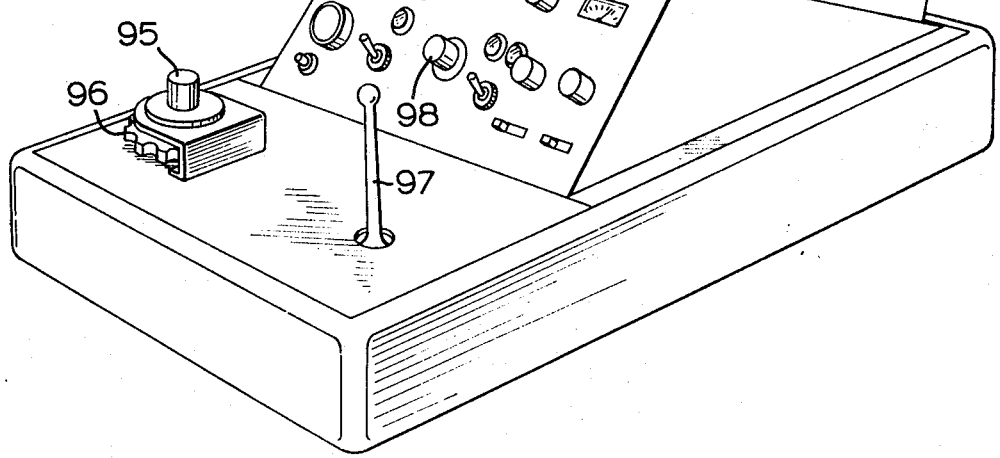

STABILIZED CAMERA MOUNT

BACKGROUND OF THE INVENTION

When it is desired to mount a device such as a camera on a vehicle it is usually necessary, if the camera is to be used to image objects on the ground or some other stable reference plane, that the camera itself be stabilized in some manner.

In one particular form the camera and its operator have been positioned on a vibration-isolated platform. The operator is able by means of suitable controls to aim the camera and make the necessary adjustments. It will be evident however that in order to maintain the camera aimed at a particular object, the operator will have to observe deviations in the imaging of the objects with a viewfinder and correct for these deviations. It will also be evident that he cannot, at the same time, devote a great deal of attention to the other adjustments such as focus, aperture, frame speed, etc. It will also be evident that in order to keep the camera aimed at the object the operator has to continually correct for an observed error thus resulting in errors in the recording of the image. Such a mode of operation, while satisfactory to a limited degree, depends to a great extent upon the expertise of the camera operator.

Other cameras have been provided for reconnaissance and photographic mapping purposes which are substantially stabilized. However these cameras do not in general permit the location of an object by the operator and automatic tracking by the camera thereafter. In most cases such cameras merely take the series of photographs along a predetermined path while providing suitable compensating for the aircraft movement. Many such cameras compensate for aircraft motion by means of moving the film and it is evident that this particular mode of compensation would be most unsatisfactory in the case of a moving picture camera.

SUMMARY

In accordance with this invention there is provided a stabilized platform for the optical device. This platform is stabilized by rigidly attaching to it three rate gyros so arranged relative to each other that the resulting amplified inertia is equal in all directions of rotation. The platform is made slightly pendulous and the artificial inertia of the gyroscopes provides a very long period of oscillation. These oscillations are damped by a servosystem whose input signal is derived from the precession angles of the gyroscopes and which operates in the pitch and roll directions by moving real masses and in the azimuth direction by exerting a torque about the azimuth axis. The azimuth correction is primarily to compensate for frictional effects. Prolonged azimuth correction can only be obtained by means of a reference such as a compass which must provide the necessary azimuth information. The view of the optical device is displayed on a display device at the operators control panel which also contains the necessary controls to adjust the field of view, the position of view, aperture, etc.

A clearer understanding of this invention may be had from a consideration of the following description and drawings.

DESCRIPTION OF THE DRAWINGS

FIG. 4 is a view of a portion of the apparatus shown in FIG. 1 constituting the stabilizing portion;

FIG. 5 is a schematic diagram of a rate gyro;

FIG. 6 is a detailed view of a portion of the apparatus of FIG. 4;

FIG. 7 is a view of the operators control panel;

Figure 1:
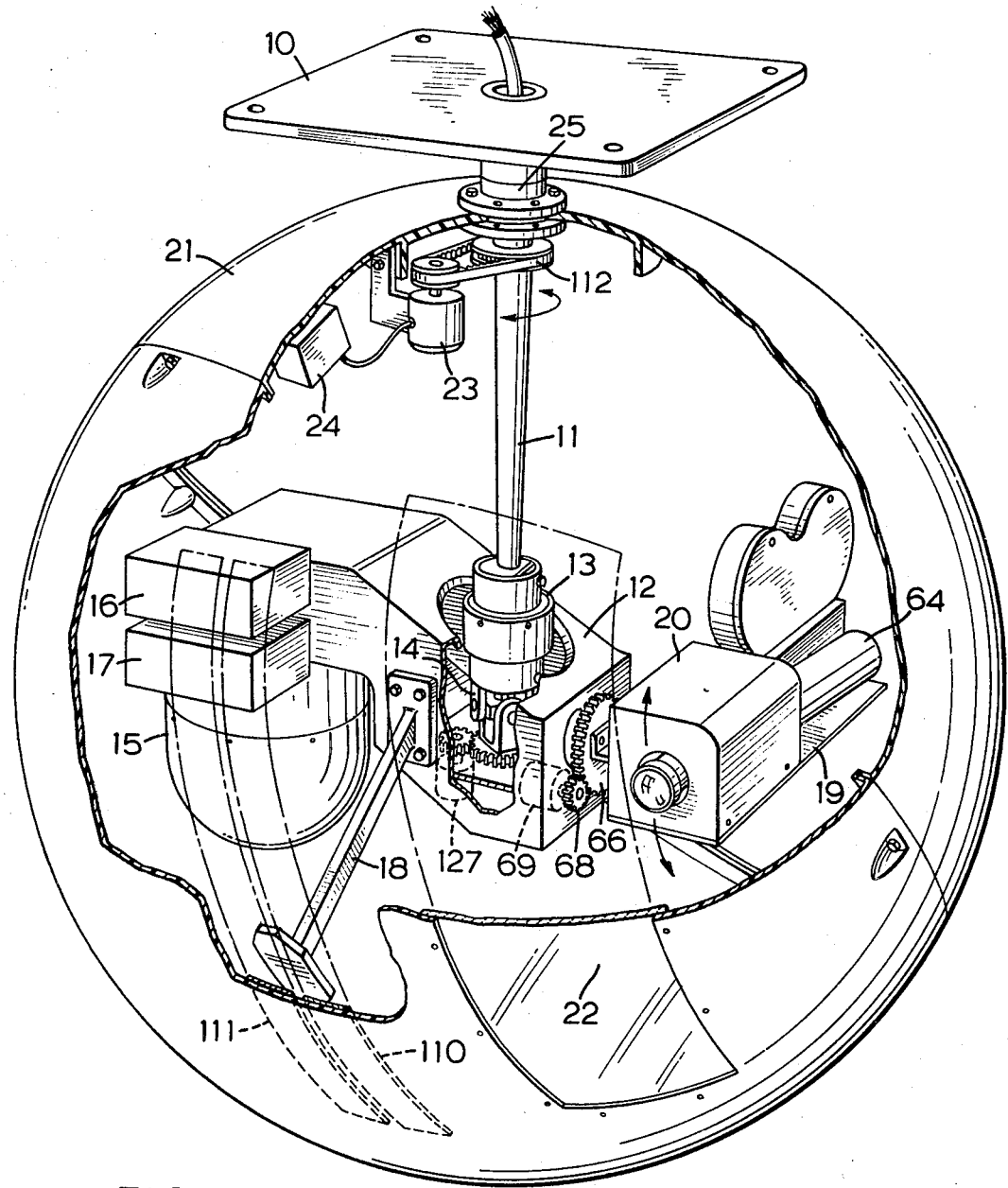
FIG. 1 is a general view of the apparatus including the stabilized platform but not the operators control panel.

Considering first FIG. 1 there is shown a general view of the whole stabilized platform, including a mounting plate 10 which is arranged for attachment to the vehicle, to which there is attached a hollow quill 11 which supports the stabilized platform, bearing general designation 12, by means of a vibration-isolating assembly 13 and a universal joint 14. The stabilized platform assembly consists of a generally box-shaped structure having mounted at one end thereof a gyro-stabilized assembly 15, electronic components in containers 16 and 17, location-sensing probe 18, and a tiltable bed 19 on which is mounted the optical device here illustrated as a cinecamera. This whole assembly is surrounded by a fairing 21 of generally spherical shape having a window 22 through which the camera 20 is aimed.

In order that this window shall be maintained in front of the camera lens, it is necessary for the fairing 21 be rotatable and it is so arranged by mounting it rotatably on bearing 25 on the quill 11 and arranging it to be rotated by driving motor 23 which is suitably energized by electronic components in enclosure 24.

Figure 2:
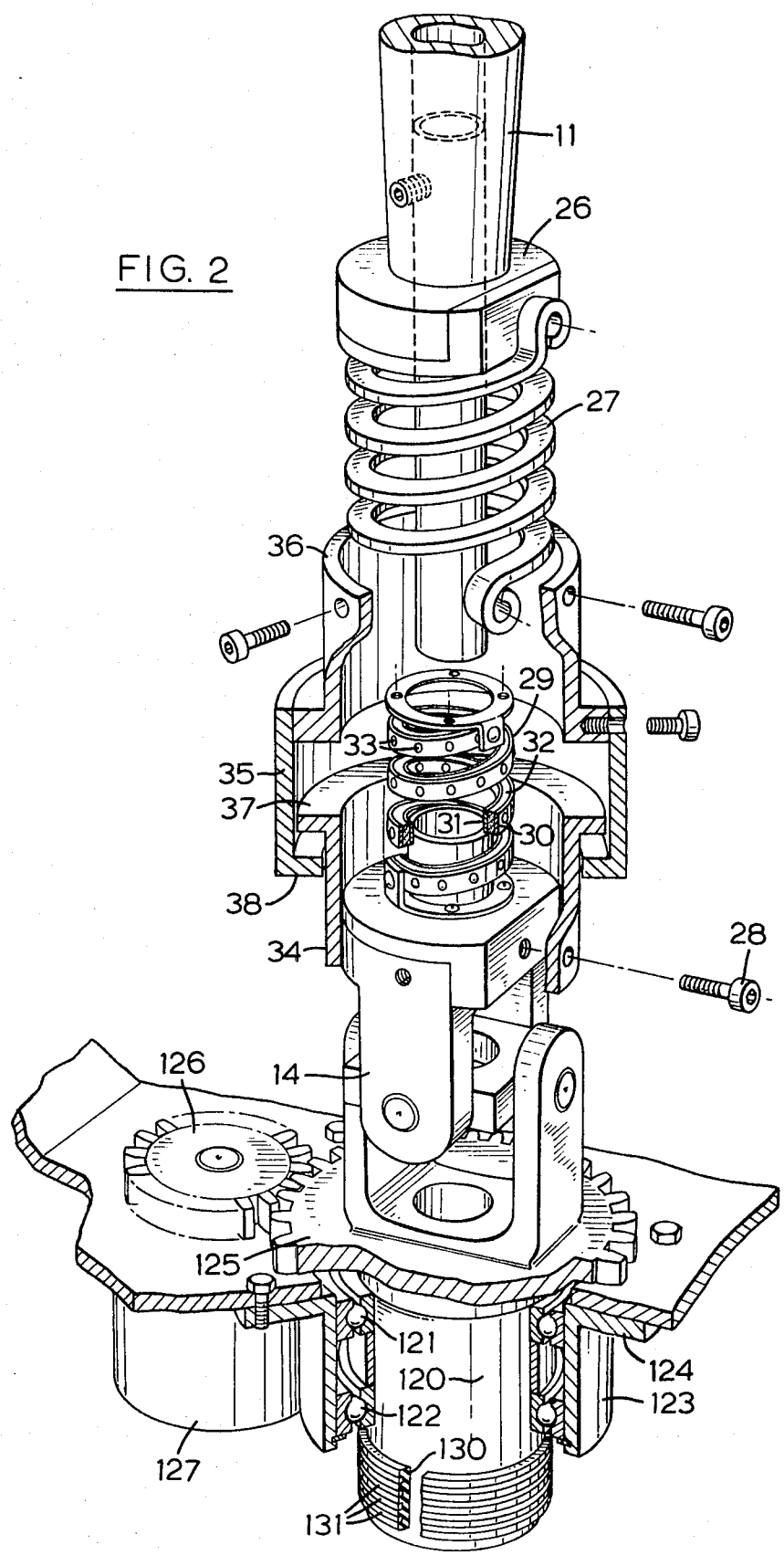
FIG. 2 is an exploded view of portion of the suspension mechanism.

FIG. 2 is an exploded view of the vibration isolating mechanism 13. It will be seen that quill 11 terminates in a hub 26 to which is bolted a flat helical spring 27. The other end of this helical spring is fastened to the base of the yoke of universal 14 by means of bolt 28.

Considering this portion of the mechanism it will be evident that the whole stabilized platform 12 is suspended from the quill 11 by means of the helical spring thus providing a certain amount of vibration isolation between the vehicle to which the quill 11 is mounted and the stabilized platform. Mounts of this nature, however, are subject to instability because of the resilience of the spring and natural periodic motions tend to be exaggerated. To minimize these natural periodic motions a damper mechanism is provided consisting of the spiral of material designated 29 in the drawing. This spiral of material consists of two metallic strips 30 and 31 and sandwiched between them a deformable plastic material, with a very low resilience, designated 32. This material may be an organic plastic heavily loaded with lead powder. The spacing between the strips 30 and 31 is maintained by series of rivets 33 which also secure the plastic material between the two strips. The ends of this spiral device are fastened to the hub 26 and to the yoke of universal 14; that is to the same point as the ends of helical spring 27.

This whole assembly is enclosed in a pair of cylindrical members 34 and 35, 34 being mounted on the end of the universal yoke and 35 being mounted by means of sleeve 36 onto the hub 26. These two cylindrical members also function as limits to prevent over extension of the spring 27 by interference of flanges 37 and 38.

The lower end of the universal assembly 14 consists of a shaft 120 which protrudes through a hole in platform 12 and is rotatably supported by means of bearings 121 and 122 in a sleeve 123. The upper end of the sleeve 123 expands into a flange 124 which is bolted to the platform 12. The lower end of universal 14 also includes a gear 125 which is fixed to the universal and engages a pinion 126 mounted on motor 127.

Figure 3:
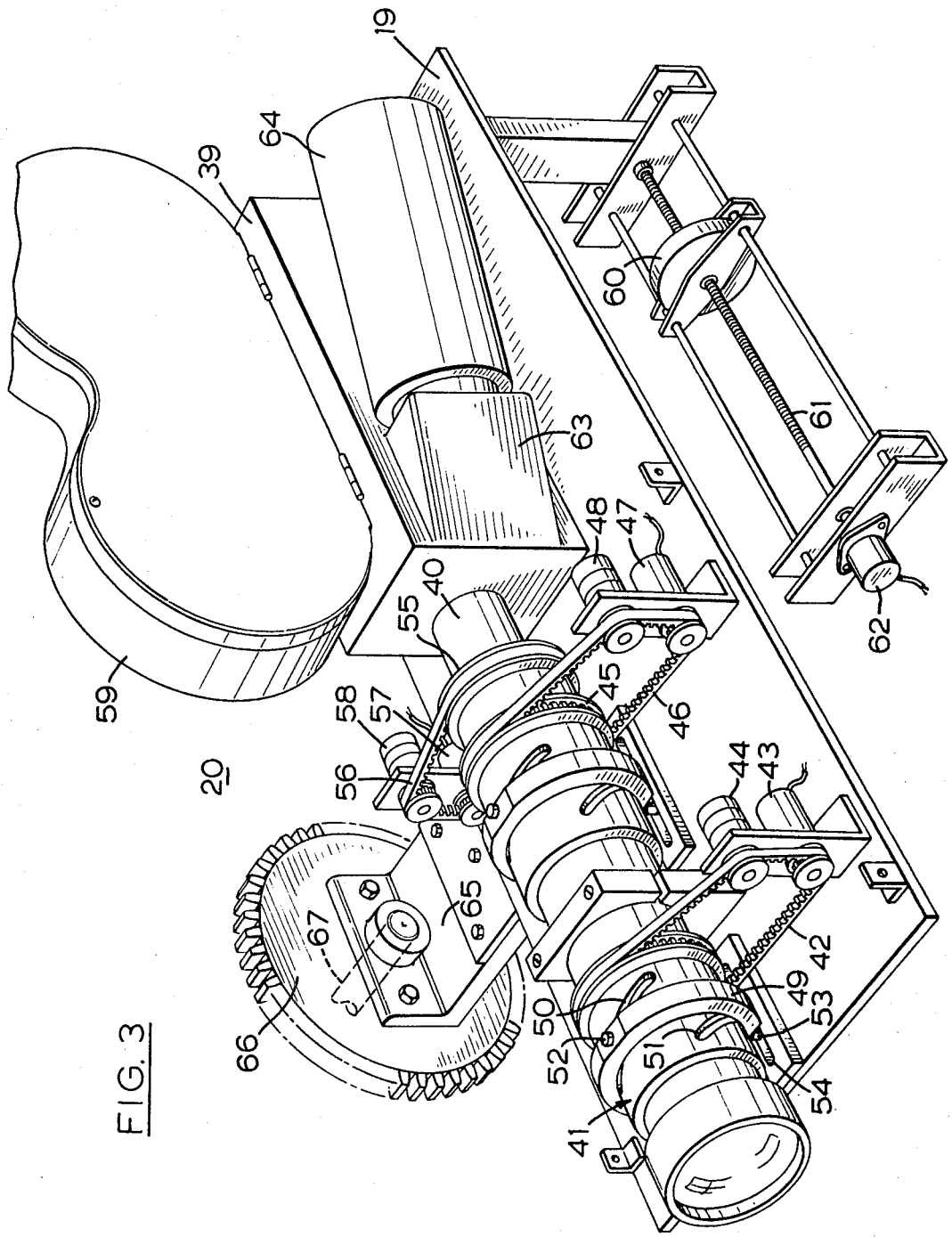
FIG. 3 is a view of the optical apparatus showing the various adjusting mechanisms and compensating mechanisms.

The camera assembly 20 and its mounting plate is shown in greater detail in FIG. 3. Here it will be seen that, mounted on the plate 19, is a cinecamera 39 including a lens assembly 40. The forward portion of the lens assembly designated 41 is the focusing section and rotation of the focusing section 41 by means of the tooth belt 42 which in turn is driven by the focus drive motor 43 adjusts the focus of the camera. Potentiometer 44 provides a readout of the position of the focus section. Compensating weight 49 engages slots 50 and 51 in the focus assembly by means of studs such as 52 and 53. Stud 53 also engages slot 54 which prevents rotation of the compensating weight 49. Rotation of the focus assembly therefore results in longitudinal motion of the compensating weight 49.

The aperture adjustment assembly 55 is driven by tooth belt 56 which in turn is driven by aperture adjustment motor 57.

A compensating weight assembly, similar to that described in the association with the focus assembly is provided for the zoom section of the lens and rotation of the zoom assembly by motor 47 and toothed belt 46 results in longitudinal motion of the compensating weight as well as rotating multiple potentiometer 48.

During operation of the camera film is transported from one end of the magazine 59 to the other thus causing a displacement of the center of gravity of this equipment. In order to maintain the center of gravity fixed the compensating weight 60, shown beneath the camera platform 19, is driven by a worm 61 which in turn is driven by a flexible drive from the same mechanism which provides the film transport. Rotation of worm 61 also provides the rotational information to potentiometer 62 which provides a film footage indication.

The view finder of the camera is shown projecting from the side of the main body as a wedge-shaped structure 63. In normal operation the eye would be applied to this view finder. In the remote operation, for which this structure is designed, a television camera tube 64 is arranged to view the scene through the view finder.

It will be seen that the platform 19 is mounted by means of flange 65 to gear 66 and the whole apparatus mounted for rotational movement on shaft 67 which is mounted in the platform 12. It will be seen that gear 66 engages pinion 68 in FIG. 1. Pinion 68 is driven by tilt motor 69.

The gyro stabilizer assembly 15 is shown in greater detail in FIGS. 4, 5, and 6. In FIG. 4 it will be seen that this assembly includes baseplate 70 on which are mounted three or more gyro assemblies. Each gyro assembly as illustrated in FIG. 5 comprises effectively at least one gyroscopic wheel designated 74 which has an axis of spin designated 75 and which is mounted in a gimbal 76. The gimbal 76 is in turn mounted in bearings which permit the gyroscope wheel to rotate or precess about an axis at right angles to the spin axis. The gimbal 76 is partially restrained from rotation thus maintained, under stable conditions, in an aligned position with respect to the frame by means of spring 128 stretched across the frame and fastened to the gimbal 76. The gyroscopic wheel is spun about its spin axis 75 by means of a suitable drive for example an electric motor (not illustrated). Any attempt to rotate the frame of the gyro other than about the spin axis will result in a precession of the gyroscope wheel 74 and rotation of the gimbal 76 in the frame. The precession will result in a torque on the frame which tends to oppose the attempted rotation. This torque resembles the opposing torque which would be produced by large inertia. Furthermore, the rotation of the gyroscopic wheel 74 and the gimbal 76 results in rotation of a portion of the potentiometer 77 which produces a signal. This signal is a measure of the deviation of the frame of the gyro. The axis of the gyroscopic wheels are so arranged that any attempt to move the platform 70 other than by simple translation, that is any attempt to rotate the axis in any way, will result in an output signal from the potentiometer of at least one of the rate gyros.

While the gyroscopic action of the rate gyros is such as to provide a large artificial inertia to the late 70 thus stabilizing the platform 12, nevertheless some disturbances of the platform will be permitted. These disturbances will produce signals in potentiometers such as 77 which may be used to operate a further stabilizing apparatus. This apparatus consists of a pendulum designated 78 which is better illustrated in FIG. 6 where the shaft of the pendulum 79 is shown mounted on a half-gimbal 80 which is mounted for rotation on shaft 81. The shaft 79 passes through a slot in half-gimbal 82 and this half-gimbal is mounted for rotation on a pair of stub shafts 83 and 84. A driving motor 85 is coupled to stub shaft 83 and a further driving motor 86 is coupled to shaft 81. Output potentiometers 87 and 88 are coupled to shafts 84 and 81 respectively.

The whole pendulum assembly is mounted on a plate 89 which is mounted on the end of a pillar 90 on plate 70. Plate 70 is rotatably mounted on platform 12 and arranged to be rotatably coupled thereto by means of a gear 91 which is fixed to platform 70 and engages pinion 92 which is driven by pan motor 93 mounted on platform 12.

The various components thus far described, together with their necessary electronic devices in the various compartments 16 and 17 are enclosed as has been indicated in the sphere 21 which is to be mounted on the vehicle. Remote from the sphere is an operators console as shown in FIG. 7. The upper part of the console consists of a closed circuit television display which is the display unit associated with camera 64 and is designated 94. The various controls on this panel are the normal controls for closed-circuit television display units, including height, width, contrast, and linearity controls for the picture. At the front of the operators console is a coaxial control, the upper portion focusing the lower portion zoom control being designated 95 and 96 and used to control the motors 43 and 47 respectively. The other control in the front of the control unit is a joystick control designated 97 for the control of camera position permitting the camera to be rotated by the pan motor 93 or the tilt motor 69.

Other controls such as control 98 control the aperture, camera drive, etc., and displays such as meter 99 indicate film footage, frame rate, zoom position, etc., the specific arrangement of the various components being matter of convenience it only being necessary that adequate controls are available to the operator to properly operate the optical equipment with the desired end.

Figure 8:
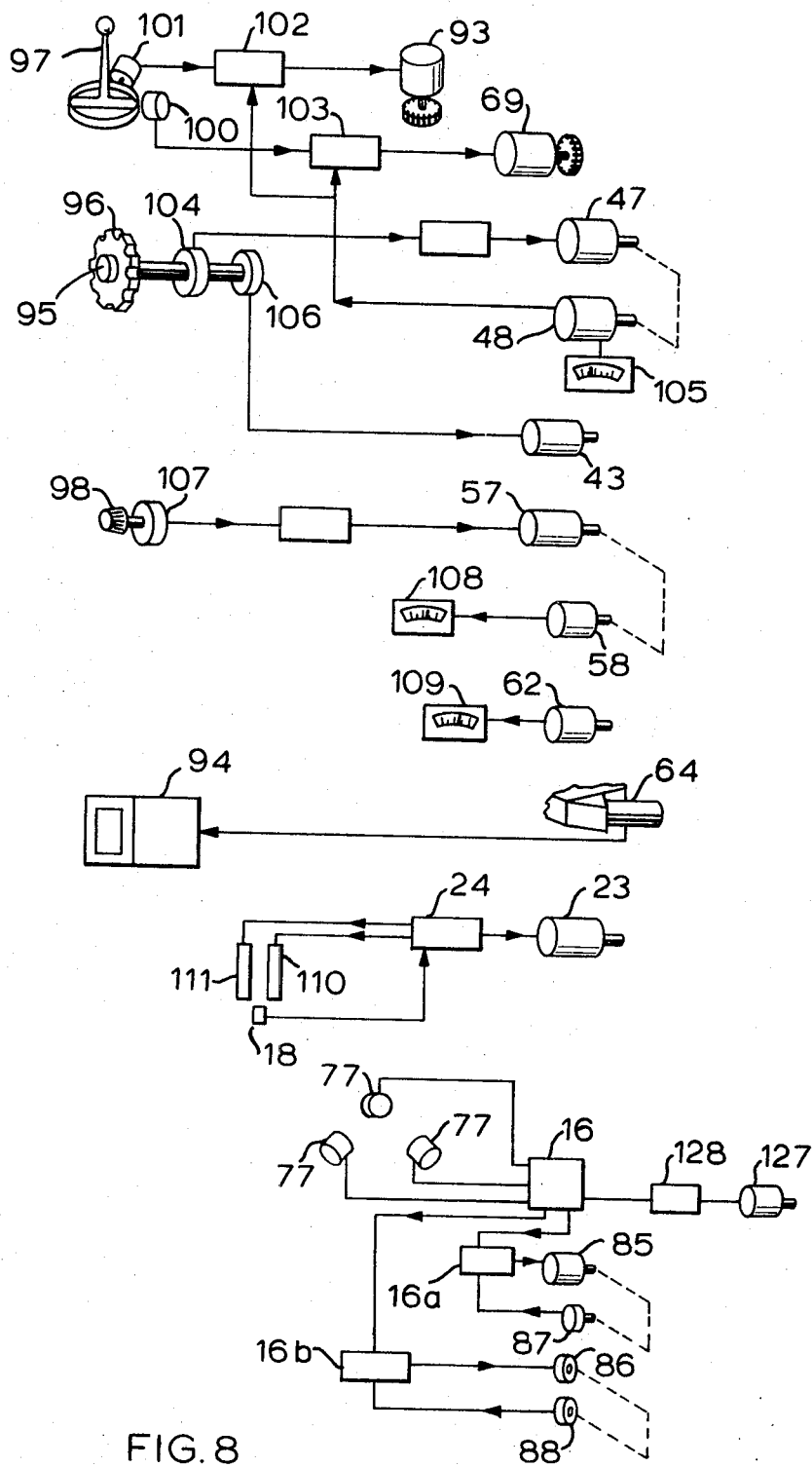
FIG. 8 is a functional block diagram of the system.

The operation and various controls of the system may be better appreciated from consideration of FIG. 8 which is a schematic block diagram of certain portions of the electronic equipment and associated mechanical equipment. It will be seen that control 97 operates a pair of transducers 100 and 101 which produce signals which are applied to control amplifiers 102 and 103. These control amplifiers produce signals which are applied to motors 93 and 69 respectively.

The zoom control 96 controls a potentiometer 104 which controls the drive on motor 47. As the operator turns control 96 it causes motor 47 to operate in one direction or the other with the speed dependent on the amount of rotation of the knob. Motor 47 is mechanically coupled to potentiometer 48 which has two sections one of which produces a signal which is used to produce an indication on an indicator meter 105 which is on the operators display panel. The other section of the potentiometer 48 produces a signal which is applied to amplifiers 102 and 103 causing their gain to be dependent upon the position of the zoom lens. In this way sensitivity of the operators control 97 is made proportional to the position of the zoom lens which in turn determines the field of view of the optical apparatus.

The focus control 95 operates a potentiometer 106 which controls the operation of motor 43 focusing the camera. The focus of the camera of course may be determined by visual inspection of the image by the operator. Control 98 operates potentiometer 107 which controls motor 57. Motor 57 is mechanically coupled with potentiometer 58 which produces a signal which is indicated on indicator 108 indicating the aperture of the lens. Potentiometer 62 associated with the film drive mechanism produces an output signal which is used to energize indicator 109 which indicates the film footage.

The other electronic equipment is associated with the stabilizing mechanism and comprises the potentiometers 77 which are coupled to the electronic equipment enclosed in an enclosure 16. The combined effect on these inputs is applied to motors 85 and 86 in such a way as to cause the pendulum to be displaced to compensate for the disturbing force. The motors 85 and 86 are mechanically coupled to potentiometers 87 and 88 which produce signals which are fed back in a motor control system to stabilize the system in a manner well known in the servomechanism art. A signal is also derived and applied to motor 127 through amplifier 128 to compensate for any rotational disturbing forces particularly the friction of bearings 121 and 122.

Figure 9:
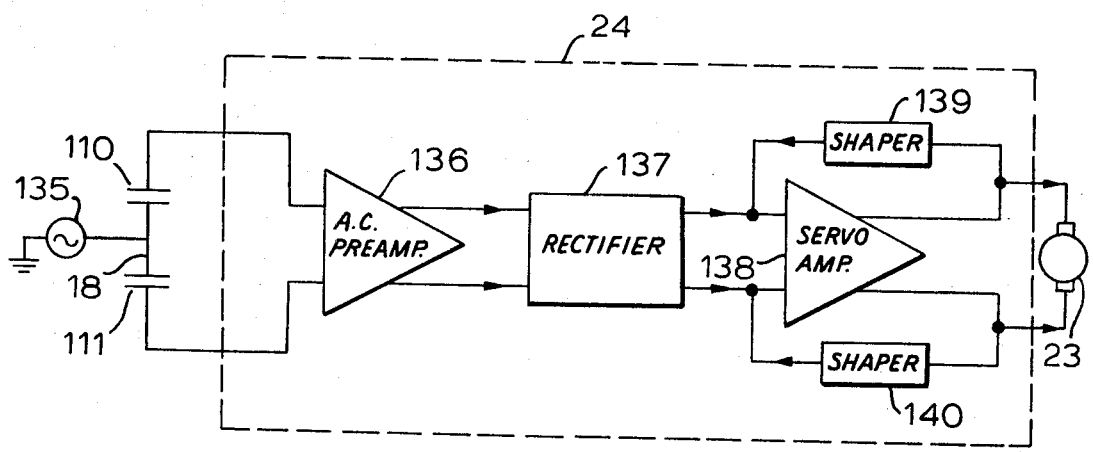
FIG. 9 is a block diagram of the fairing slaving subsystem.

As was indicated previously it is necessary to keep window 22 in front of the lens of the camera. To this end sensor 18 of FIG. 1 also shown in FIGS. 8 and 9, normally overlaps two sensing strips 110 and 111 equally. Sensor 18 is supplied with alternating current from a source shown as alternator 135 in FIG. 9. The potential appearing on strips 110 and 111 will be a function of the amount of overlap of sensor 18 and each of the strips. These potentials are applied to amplifier 136 and the outputs from he amplifier applied to rectifier 137. The rectifier and amplifier are so arranged that if the potential appearing on strip 110 is greater than the potential appearing on strip 111 the rectifier produces an output of one polarity while if the potential appearing on strip 111 is greater than that on strip 110 an output of reverse polarity is produced. This reversible potential is applied to servoamplifier 138 from which an output is applied to motor 23. This output is such as to cause motor 23 to rotate in one direction or the other in such a way that the window 22 is maintained in front of the camera lens. Shaper circuits 139 and 140 provide a feedback to stabilize the servo loop including the amplifier 138 and motor 23. Rotation of motor 23 is applied to the quill 11 by means of toothed belt 112 which couples a pinion on the end of motor 23 to a gear on quill 11.

OPERATION

In operation the apparatus as generally illustrated in FIG. 1 is suspended from an aircraft such as a helicopter or some other vehicle. At rest the gyroscope wheels will all be aligned in a particular direction depending upon the springs 128 and the assembly as a whole will hang down from the pillar 11 by universal joint 14, being slightly pendulous, and assume a position roughly horizontal. If the equipment is now energized and the gyro wheels given an opportunity to run up to their operating speed the stabilizer assembly 15 will attempt to remain in the same reference position with respect to the horizontal. At the same time the fairing 21 will be rotated by the servomechanism associated with sensor 18 so that the window 22 is in front of the camera. The camera will assume a position dependent upon the controls operated at the operators console and an image as viewed through the view finder will be displayed at the operators console.

If the vehicle is now put into motion the platform 12 will tend to stay in the same reference position. Assuming the helicopter is now in flight the operator may direct the camera towards an object which is intended to observe or record. By operating the joystick control 97 the camera may be effectively rotated by the azimuth or pan motor 93 or tilted by the tilt motor 69. The image from the viewfinder is displayed on the operators display unit 94 and by adjustment of the zoom and focus controls 95 and 96 the image may be suitably controlled. Once having located the camera with reference to the object to be photographed the camera will tend to stay aimed in the same direction, irrespective of the maneuvers of the aircraft. The vibrations of the aircraft are isolated from the platform by means of the isolating mechanism 13 whose general operation has been previously explained. Pitch and roll motions of the aircraft will be absorbed by the universal 14 and yaw variations will be absorbed by the bearings 122 and 121, all these devices operating in association with the stabilizing device 15 and its associated motors. For example if the yaw of the aircraft results in a rotation of bearings 121 and 122, the friction of the bearings may be sufficient to cause a rotational tendency in the platform 12. This will cause rotational tendency in stabilizing device 15 tending to rotate plate 70. Any such rotation of plate 70 however is opposed by the gyroscopic stabilization of the gyro 71, 72, and 73. If the stabilizing effect is insufficient to prevent substantial rotation of plate 70, then the gyro gimbals will be tilted and gimbal 76 for example will rotate causing a signal to be produced in potentiometer 77 and the other potentiometers associated with the gyros. These signals will be combined and as shown in FIG. 8 applied to the motor 127 in such a way as to compensate for the friction of the bearings and overcome any rotational tendency applied to platform 12. In the same way friction in the bearings of universal 14 produced during roll and pitch actions will be compensated for by adjustment of the pendulum 78.

If now the operator desires to image a different object or follow an object during a fly past he may cause the camera to pan for example by pushing control 97 sideways thus actuating the applicable transducer and causing motor 93 to rotate, driving pinion 92 which in turn is coupled to gear 91 thus driving the platform 12 around the stabilized platform 70. Again any friction in bearings 121 and 122 is compensated for by motor 127. As the camera is panned, sensor 18 moves to one side with respect to strips 111 and 110 causing a signal which produces an output which is applied to motor 23 in such a direction to cause fairing 21 to rotate and maintain window 22 in front of the lens. Signals perceived by the operator at his operating panel may indicate that the illumination of the object is such that the camera requires a different aperture setting. This will be indicated for example on indicator 99 and the aperture may be adjusted by adjustment of control 98.

The object may also change in distance and may necessitate an adjustment of the focus control. The necessity for focus adjustment will be indicated on the display 94 and the operator will make the necessary adjustment to obtain a clear sharp picture.

It may also be desirable to change the angle of view of the camera by the zoom adjustment. This may be accomplished by adjustment of control 96 as previously indicated.

As has been indicated, movement of the zoom and focus adjustments will result in movements of substantial masses causing an unbalance of the system. In order to compensate for this tendency compensating weight 49 and a similar weight in the zoom assembly move in a direction opposite to the direction of motion of the lens components. The weights are so selected and the angle of the grooves 50 and 51 so arranged that adjustment of the focus and zoom does not result in a change of balance of the mechanism.

In a similar manner, as previously indicated, the film drive is coupled mechanically to worm 61 which drives the weight 60 which moves in a direction parallel to the direction of motion of the film but in a reverse direction thus resulting in a mechanical compensation for the displacement of the weight of the film.

As will be appreciated from the foregoing description an apparatus has been described which provides a stabilized platform for an optical device, compensates for disturbing forces which might otherwise effect this stabilized platform and provides the necessary apparatus to permit a remote operator to utilize the optical apparatus.

It will be evident that those skilled in the art that numerous modifications can be made to this system to permit utilization of various devices on the optical platform with suitable modification of the mass compensating mechanisms. It will also be evident that some modifications may be made to the mechanical arrangements substituting gears for tooth belts for example and changing the mechanical arrangements relating to the drive of weight 60 to permit it to be located in other positions other than where shown and the apparatus can of course be located in different positions on platform 12 to provide for an essentially balanced arrangement in a slightly pendulous position.

The embodiments of the invention in which an exclusive property or privilege is claimed are defined as follows:

1. A stabilized platform supported to permit appreciable angular motion about three mutually perpendicular axes, at least three gyroscopes mounted on said platform with their spin axis aligned in three different directions each supported to permit rotational freedom about an axis perpendicular to its spin axis but fixed in other axes whereby rotational movement of the platform is constrained by virtue of the artificial inertia provided by the gyroscopes and such movement causes precession of at least one of said gyroscopes about its rotationally free support axis, means to measure the procession angle of said gyroscope and to produce a signal proportional to said precession angle, a pendent mass suspended from said platform and free to move on two axes at right angles to each other, means responsive to said signal to apply a force between said pendent mass and said platform proportional to said signal and thereby apply a torque to said platform the magnitude and direction of said torque being such as to minimize the rotation of said gyro about its precession axis.

2. A stabilized platform as claimed in claim 1 including a payload means associated with said platform to compensate for changes of center of gravity of said payload including a further mass moved in response to changes in center of gravity caused by operational movement of movable portions of said payload.

3. A stabilized platform as claimed in claim 2 wherein the payload includes an optical device with a movable lens element and said further mass is moved complementary to said lens to compensate for changes of center of gravity which would otherwise be caused by movements of said lens.

4. A stabilized platform as claimed in claim 2 wherein said payload includes a camera with means to cause displacement of film in said camera and said further mass is moved complementary to said film movement to compensate for changes of center of gravity which would otherwise be caused by movement of said film.

5. A stabilized platform as claimed in claim 2 wherein said payload may be steered relative to said platform.

6. A stabilized platform as claimed in claim 3 arranged for operation while supported from a moving vehicle including a rotatable surrounding fairing to protect the platform from wind loading, a window in said fairing and means to maintain said window aligned with the line of view of said lens elements.

7. A stabilized platform as claimed in claim 1 arranged for operation while supported from a moving vehicle the supporting means including a vibration isolating and damping means including a helical spring and a coaxial helical damper said damper comprising two coaxial metallic helical strips and a layer of nonresilient deformable plastic material interposed between said strips and means to retain said strips and said layer in superposed relationship in the form of a compound strip.

* * * * *